Sept. 23, 1947.   R. B. COLTON ET AL   2,427,660
RADIO DIRECTION FINDING SYSTEM
Filed June 27, 1944   4 Sheets-Sheet 2

INVENTORS.
ROGER B. COLTON,
REX V.D. CORPUT
PAUL E. WATSON DECEASED by
ELEANOR T. WATKINS ADMINISTRATRIX
BY William D Hall.
ATTORNEY.

Sept. 23, 1947.          R. B. COLTON ET AL          2,427,660
RADIO DIRECTION FINDING SYSTEM
Filed June 27, 1944          4 Sheets-Sheet 3

FIG. 4.

INVENTORS.
ROGER B. COLTON,
REX V. D. CORPUT
PAUL E. WATSON DECEASED by
ELEANOR T. WATKINS ADMINISTRATRIX
BY William D. Hall.
ATTORNEY.

INVENTORS.
ROGER B. COLTON,
REX V. D. CORPUT
PAUL E. WATSON DECEASED by
ELEANOR T. WATKINS ADMINISTRATRIX

BY *William D. Hall*

ATTORNEY.

Patented Sept. 23, 1947

2,427,660

UNITED STATES PATENT OFFICE 2,427,660

RADIO DIRECTION FINDING SYSTEM

Roger B. Colton, Washington, D. C., Rex V. D. Corput, Belmar, N. J., and Paul E. Watson, deceased, late of West Long Branch, N. J., by Eleanor T. Watson, administratrix, Asbury Park, N. J.

Application June 27, 1944, Serial No. 542,420

14 Claims. (Cl. 250—11)

(Granted under the act of March 3, 1883, as amended April 30, 1928; 370 O. G. 757)

The invention described herein may be manufactured and used by or for the Government for governmental purposes, without the payment of any royalty thereon.

Our present invention relates to determining the direction of arrival of wave energy, particularly, though not exclusively, radio-frequency energy, whereby the location, in azimuth or elevation, or both, of the source of said energy, especially a moving source, may be fixed with respect to the known location of a detecting station.

It is presently the practice, in order to make such a determination, to provide a directional antenna, usually a loop or array, which is mounted for rotation on a vertical or horizontal axis, depending upon whether the location of the source is desired in azimuth or elevation. Disposed about one or the other of said axes, with the appropriate one as its hub, is an angularly-calibrated scale; in the case where azimuthal bearing is desired, with its zero indication aligned with a reference compass point, for example, north; and in the case where angle of elevation is desired, with its zero indication aligned with the tangent to the earth's surface at the location of the detecting station. In use, the antenna is manually oscillated on its axis until its position is such that the amplitude of the received signals is a maximum. The location in azimuth or elevation of the source of said signals is then determined by reading, on the appropriate one of the above-mentioned scales, the bearing of a predetermined reference axis of the antenna with respect to one or the other of said zero indications. Said reference axis is usually that axis which is normal to the plane of the antenna.

While reference has been made to obtaining maximum signal amplitude, as is well known, minimum signal amplitude has been used for the same purpose, merely requiring a different antenna reference axis.

The foregoing procedure has many disadvantages, the most important one of which is its susceptibility to error. For example, inasmuch as either a movement of the antenna or movement of the source of energy produces the same result, namely, a change in the amplitude of the received signals, it is extremely difficult, if not impossible, to recognize the maximum or minimum signal, and so follow the source. As a result, only sporadic bearings can be obtained, whereas it is necessary, for accurate tracking, to obtain a continuous flow of data.

It is, therefore, the main object of our present invention generally to improve the art of determining the location of a source of wave energy, particularly a moving source of radio-frequency energy, by providing a system which eliminates the difficulties above specifically set forth.

It is a further object of our present invention to provide a system for tracking a source of wave energy, whether the wave is initiated at said source, or is initiated elsewhere and is reflected or reradiated thereby, which is simple in construction, easy to manufacture and assemble, and which may be efficiently utilized for its intended purpose by personnel having much less technical skill, and requiring much less training, than has heretofore been necessary for the operation of similar equipment.

These, and other objects and advantages, which will be better understood as the detailed description progresses, are attained in the present invention in the following manner:

For a determination of azimuthal bearing, we provide a collector, or antenna, rotatable on a vertical axis, and preferably including two elements, or bays, each of which preferably comprises an array of dipoles, the appropriate number and arrangement of the elements in each array depending, in a well known manner, upon the over-all directional characteristics or response pattern desired. Said antenna bays are connected to a common receiver through transmission lines which normally are of equal electrical lengths, said transmission lines being provided with means for varying the electrical lengths thereof.

As long as the electrical lengths of said transmission lines remain equal, the signals collected by said antenna bays combine at the receiver in phase so that, in effect, the then direction of maximum response of said antenna, hereinafter referred to as the reference axis, lies in that vertical plane which is normal to the plane of said antenna. If, now, the relative electrical lengths of said transmission lines are altered, the signals collected by said antenna bays combine at the receiver in such out-of-phase relationship that, in effect, the direction of maximum response of said antenna is shifted in the direction of that antenna bay whose transmission line is of the greater length, the angle between said reference axis and said altered direction of maximum response being a function of the magnitude of the difference between said electrical lengths. By alternately and oppositely altering the electrical lengths of said transmission lines, the direction of maximum response is shifted, first to one side of said reference axis, and then to the other.

Now by comparing the amplitudes of the signals received while the direction of maximum response is in each of the positions described, a bearing of the source of said signals may be obtained. Only when said source lies in a plane coincident with said reference axis, are the signals, which are received while the directions of maximum response are in their altered positions, of equal amplitude, and therefore, by rotating the antenna until such equality is attained, the bearing of the reference axis, at that time, constitutes the bearing of the source of said received signals.

For a determination of angle of elevation, equipment similar to that described for azimuthal bearing may be used, except that the antenna is mounted for rotation on a horizontal rather than a vertical axis, the number and arrangement of the dipoles making up the antenna bays are appropriately altered to obtain sharp discrimination in a vertical rather than a horizontal plane, and the angularly-calibrated scale is disposed in a vertical rather than a horizontal plane.

In a modified form of our invention, azimuthal bearing and angle of elevation are obtained simultaneously. For the attainment of this result, we provide a collector, or antenna, rotatable on both vertical and horizontal axes, and preferably including four bays of collector elements connected, through appropriate transmission lines, to a common receiver. Each transmission line is provided with means for altering the electrical length thereof. By continually and simultaneously altering the electrical lengths of all of said transmission lines so that at each instant the signals collected by the antenna bays arrive at the receiver in certain phase relationships, as will hereinafter be more fully described, the direction of maximum response of said antenna, which, when the electrical lengths of all of said transmission lines are equal, coincides with a reference axis normal to the plane of said antenna, is successively warped, preferably, first to the left of said reference axis, then to the right thereof, then above the same, and finally, below the same. Comparative signals are thereby obtained which may be used, as hereinbefore set forth, to orient the antenna to an "on-target" position. Reading the appropriate scales then apprises the observer of the azimuthal and elevational bearings of the source of the wave energy.

It will be noted that inasmuch as the foregoing systems do not depend upon observation of maximum or minimum signal amplitudes, but instead, depend upon observation of comparative signals, which are before the observer at all times, the difficulties and laborious techniques heretofore encountered are eliminated.

It is to be clearly borne in mind that while the systems described have referred to the reception of wave energy, the same principles and equipment are equally applicable to the transmission of such energy.

It is also to be clearly understood that our present invention is intended not alone for use with C.-W. energy, but may also be used for the location of a source of pulsed energy, for example, that used in the so-called pulse-echo method of object detecting.

In the accompanying specification there are described, and in the annexed drawings shown, what are at present considered preferred embodiments of the methods and means of the present invention. It is, however, to be clearly understood that the present invention is not limited to said embodiments, inasmuch as changes therein may be made without the exercise of invention and within the true spirit and scope of the claims hereto appended.

In said drawings.

Figure 1:
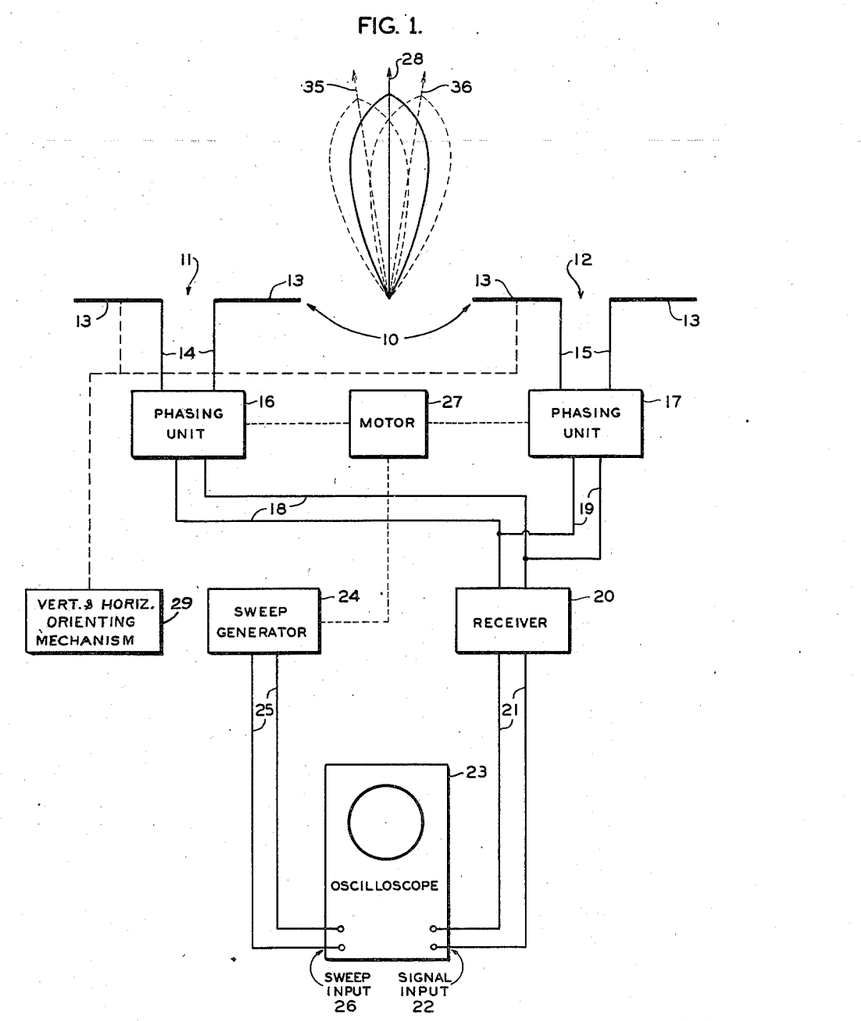
Figure 1 is a block diagram of a system for determining the direction of arrival of wave energy assembled in accordance with the principles of the present invention, said system being appropriate for the determination of either azimuth or elevation.

Referring now more in detail to our present invention, with particular reference to the embodiment thereof shown in Figure 1 of the drawings, the numeral 10 generally designates a collector, or antenna which can be oriented either on a vertical or a horizontal axis by means of orienting mechanism 29. Such mechanisms, per se, are well known in the art and require no further description. Said antenna preferably includes two coplaner collector elements, or bays 11 and 12, each bay preferably consisting of a broadside array of cophasally-related, horizontally-polarized dipoles 13. The number of dipoles in each of said antenna bays, and the physical disposition thereof, in columns and rows, will depend, in a manner well known to those skilled in the art, upon the desired over-all response pattern of the antenna.

The antenna bays 11 and 12 are respectively connected, through suitable transmission lines 14 and 15, to adjustable phasing units 16 and 17, and the latter, in turn, are connected, through suitable transmission lines 18 and 19, to a common receiver 20. We prefer that the combined electrical lengths of the transmission lines 14 and 18 be equal to the combined electrical lengths of the transmission lines 15 and 19; and the phasing units 16 and 17 may take any conventional form capable of selectively altering the effective electrical lengths of said combined transmission lines.

The output of the receiver 20 is applied, through conductors 21, to the signal-input terminals 22 of a cathode-ray oscilloscope 23. The output of a sweep generator 24 is also applied to said oscilloscope, through conductors 25 and the sweep-input terminals 26.

The phasing units 16 and 17 are mechanically coupled, as indicated in the drawings by the broken lines, to a motor 27 in such manner that when maximum delay is introduced into one transmission line, minimum delay is introduced into the other; in other words, the phasing units operate in 180° phase opposition.

Figure 2A:
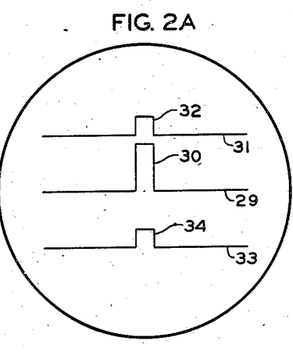
Figures 2A, 2B and 2C show a series of oscilloscope displays of the signals received through the use of a system such as is shown in Figure 1 under conditions illustrative of three different locations of the source of the received energy.
Figure 2B:
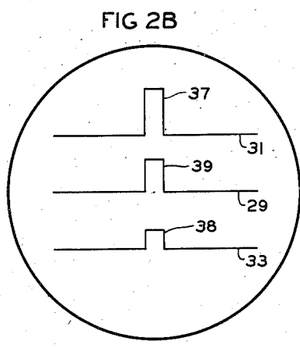
Figure 2C:
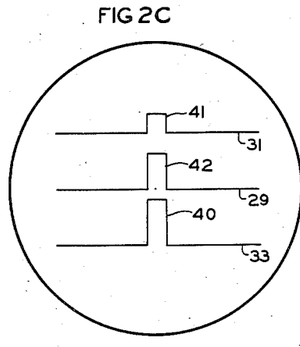
Figure 3A:
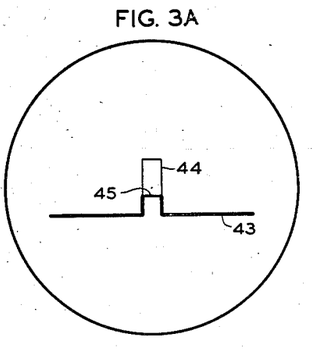
Figures 3A, 3B and 3C show a similar series of oscilloscope displays illustrative of the same locations of the source of the energy referred to in connection with Figure 2, but using a different type of signal display.
Figure 3B:
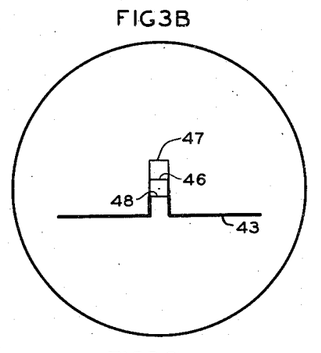
Figure 3C:
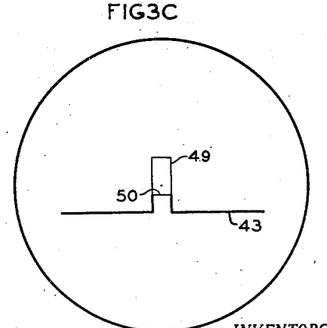

The sweep generator 24 is adapted to provide the oscilloscope 23 with a rapidly-recurring, horizontal trace which, as shown in Figures 2 and 3 of the drawings, may take the form of a plurality of base lines, displaced with respect to each other in synchronism with the shifting of the direction of maximum response of the antenna 10, or it may consist merely of one base line, all as will hereinafter be more fully described. If a multiple-sweep display is to be used, the sweep generator 24 is synchronized with the phasing units 16 and 17 by mechanically coupling said generator to the motor 27, as indicated in the drawings by the broken line between said motor and said generator. Any conventional method of vertically displacing the cathode-ray trace of the oscilloscope may be used. One method that is suitable is to provide a direct-current potential which is varied in steps by a switch driven by the motor, and applied to the vertically-deflecting plates of the cathode-ray tube so as to vertically displace said trace. One suitable circuit for this purpose is shown in Hershberger Patent 2,189,549.

Assume, now, that the phasing units 16 and 17 are instantaneously so related with respect to each other that the phase shifts introduced into the transmission lines 14—18 and 15—19 are equal; in other words, that the electrical lengths of said transmission lines are equal. Under these circumstances, the signals, or groups of signals, collected by the antenna bays 11 and 12 arrive at the receiver 20 in phase, and the direction of maximum response of the antenna 10 is along the arrow designated by the reference character 28, with the over-all response pattern of the antenna symmetrically disposed about the axis of said arrow, as shown.

The synchronization between the sweep generator 24 and the phasing units 16 and 17 is preferably such that, at the instant under consideration, the oscilloscope trace is coincident with the horizontal diameter of the oscilloscope cathode-ray tube. Such a trace is indicated at 29 in Figure 2 (A, B, C).

The algebraic addition of the instantaneous values of the two sets of signals fed to the receiver 20 from the antenna bays 11 and 12 results in the deflection 30 of the trace 29, as shown in Figure 2 (A).

Now assume that, at an instant later, the phasing units 16 and 17 are so related with respect to each other that the electrical length of the transmission line 14—18 is greater than that of the transmision line 15—19. The groups of signals now collected by the antenna bays 11 and 12 arrive at the receiver 20 out-of-phase, with the group collected by the bay 11 lagging by an amount dependent upon the magnitude of the opposite phase shifts introduced. Further assume that the source of wave energy is in the same position with respect to the antenna as before, whatever that position may be.

The synchronization between the sweep generator 24 and the phasing units 16 and 17 is preferably such that, at the instant now under consideration, the oscilloscope trace is displaced above the horizontal diameter of the oscilloscope cathode-ray-tube, as indicated at 31 in Figure 2 (A, B, C).

The algebraic addition of the instantaneous values of the signals now being received results in a deflection 32 of the trace 31, Figure 2 (A), which is of a lesser amplitude than the deflection 30 of the trace 29.

At an instant later, it is to be assumed that the phase shifts introduced into the transmission lines are reversed, that is, the line 15—19 is now the longer, electrically; and that the source of wave energy is still in the same position with respect to the antenna.

Again, it is preferred that the synchronization between the sweep generator 24 and the phasing units 16 and 17 is such that the oscilloscope trace is now displaced below the horizontal diameter of the oscilloscope cathode-ray tube, as shown at 33 in Figure 2 (A, B, C).

The algebraic addition of the instantaneous values of the signals presently arriving at the receiver results in the oscilloscope trace 33 being deflected as indicated at 34, Figure 2 (A).

It is to be noted that the deflections 32 and 34 are of the same amplitude. This indicates that the source of the wave energy must be along the reference axis of the antenna 10, in other words, in the plane which includes the direction of maximum response designated by the arrow 28; for, if said source were in a plane corresponding to the direction of maximum response designated by the arrow 35, which is the direction of maximum response when the transmission line 14—18 is electrically longer than the transmission line 15—19, the oscilloscope display would appear as shown in Figure 2 (B), and if said source were in a plane corresponding to the direction of maximum response designated by the arrow 36, which is the direction of maximum response when the electrical lengths of the transmission lines are reversed, the oscilloscope display would appear as shown in Figure 2 (C).

In further explanation of the oscilloscope display of Figure 2 (B), it may be stated that when the electrical length of the transmission line 14—18 is greater than that of the transmission line 15—19, a source of wave energy, located in the direction of maximum response designated by the arrow 35, Figure 1, will cause a deflection 37 of the oscilloscope trace 31, which is of much greater amplitude than a deflection 38 of the trace 33, the latter resulting when a reversal of the relative electrical lengths of the transmission lines causes a shift of the direction of maximum response to the position indicated by the arrow 36. Under the same circumstances, and when the direction of maximum response is along the arrow 28, the central trace 29 is deflected, as at 39, to an extent somewhere between the deflections 37 and 38.

This display advises the observer that the antenna 10 must be rotated in a counter-clockwise direction in order to attain the "on-target" condition indicated by the display of Figure 2 (A).

On the other hand, where, as shown in Figure 2 (C), the deflection 40 of the lower trace 33 is greater than the deflection 41 of the upper trace 31, the central trace 29 being deflected to an intermediate extent, as at 42, the observer knows that rotation of the antenna in a clockwise direction is necessary to attain an "on-target" condition.

Reference is now had to Figure 3 for a description of a type of oscilloscope display which makes use of a single trace, rather than the multiple trace of Figure 2. This eliminates the necessity for the mechanical coupling between the sweep generator 24 and the motor 27 for the purpose of synchronizing the displacement of the trace with the shifting of the direction of maximum response of the antenna.

In Figure 3 (A) the reference character 43 designates an oscilloscope trace which, when the direction of maximum response of the antenna is normal to the plane of said antenna, is deflected as at 44, and which, when the direction of maximum response is in either of its shifted positions, is deflected as at 45. It will be noted that although, at three successive instants, the direction of maximum response assumes three different positions, only two deflections of the trace are apparent. This indicates an "on-target" condition, for the deflection 45 is, in reality, two equal-amplitude deflections, superimposed one upon the other.

If, as shown in Figure 3 (B), three separate deflections 46, 47, and 48 can be seen, the antenna is "off-target," although, in which direction, cannot be determined from this display. The reference character 46 designates the deflection when the direction of maximum response is normal to the plane of the antenna, but each of the deflections 47 and 48 can correspond to the direction of maximum response when it is shifted to the right or the left of said normal.

If the source of wave energy is so far to the left or right of the reference direction of maximum response that during one or the other of the shifts thereof no signals are picked up, the "off-target" display then appears as shown in Figure 3 (C), where the reference character 49 designates a deflection of the trace 43 obtained when the direction of maximum response coincides with the reference axis of the antenna, and the reference character 50 designates a deflection resulting from a shift of said direction of maximum response to the left or right.

This completes the description of the basic form of our present invention, together with a description of the operation and mode of use thereof.

Figure 4:
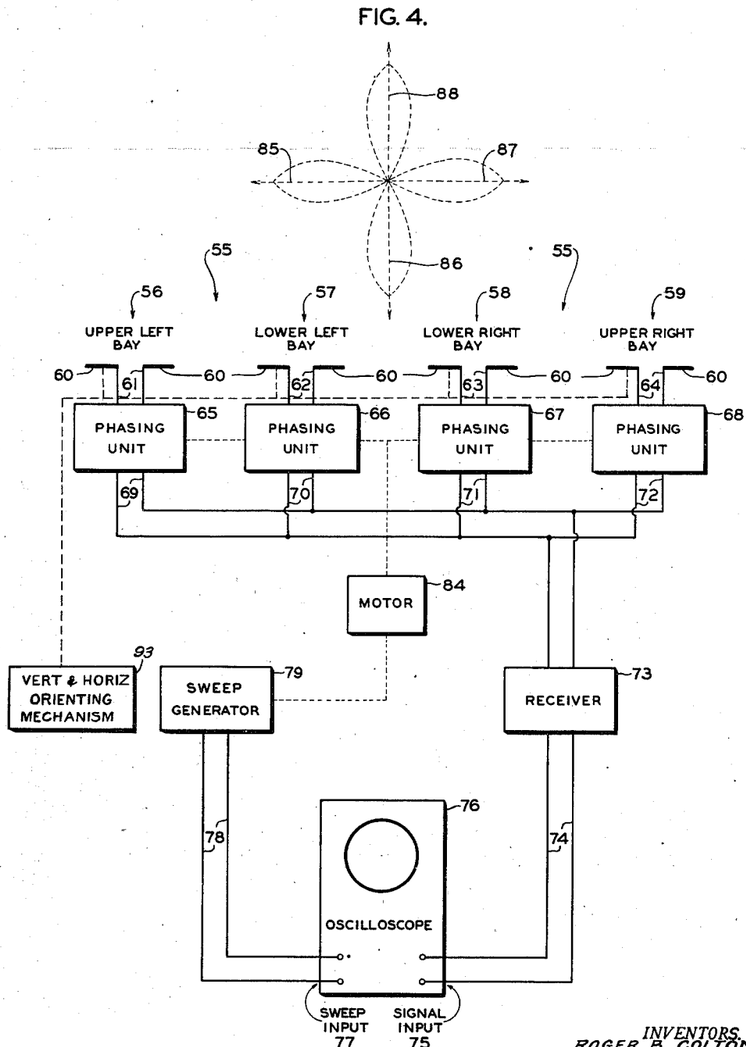
Figure 4 is a block diagram of a modified system for determining the direction of arrival of wave energy assembled in accordance with the principles of the present invention whereby azimuth and angle of elevation may simultaneously be determined.

Referring now more in detail to the modified form of our present invention, by means of which a simultaneous determination may be made of both azimuth and elevation, and with particular reference to Figure 4 of the drawings, the numerals 55 generally designate an antenna, or collector, which can be oriented either on a vertical or a horizontal axis by means of orienting mechanism 93. Such mechanisms, per se, are well known in the art. Antenna 55 preferably includes four elements, or bays 56, 57, 58, and 59, arranged, in a single plane, in the form of a square. Said antenna bays, hereinafter respectively referred to in accordance with the position which each occupies in said square, namely, upper left, lower left, lower right, and upper right, preferably comprise broadside arrays of cophasally-related, horizontally-polarized dipoles 60; and, as in the case of the antenna preferably utilized in the basic form of our present invention, the number and physical disposition of the dipoles in each of said bays depends upon the over-all directional characteristics desired of the antenna.

The antenna bays 56 to 59, inclusive, are respectively connected, through suitable transmission lines 61, 62, 63, and 64, to adjustable phasing units 65, 66, 67, and 68 which, in turn, are connected, through suitable transmission lines 69, 70, 71, and 72, to a common receiver 73. The output of the receiver is applied, through conductors 74, to the signal input terminals 75 of a cathode-ray oscilloscope 76, the latter having applied to the sweep-input terminals 77 thereof, through conductors 78, the output of a sweep generator 79. The sweep generator is adapted to provide the oscilloscope with a rapidly-recurring, horizontal trace which is periodically displaced in synchronism with the shifting of the direction of maximum response of the antenna, as will hereinafter be more fully described, whereby four equi-distantly spaced base lines 80, 81, 82, and 83 appear upon the screen of said oscilloscope.

The phasing units 65 to 68 inclusive, which are intended to perform the same function in this embodiment of our invention as the phasing units 16 and 17 described above in connection with the basic form of our invention, are so mechanically coupled to each other, and to a motor 84, as indicated by the broken lines between these various components, that the groups of signals collected by the antenna bays 56 to 59 inclusive, arrive at the receiver 73 in such phase relationships with respect to each other that, as indicated by the arrows 85, 86, 87, and 88, the direction of maximum response of the antenna 55 is shifted, preferably, first to the left of the reference axis of said antenna, then below said axis, then to the right thereof, and finally above the same. It is to be understood, of course, that the showing of the arrows in the drawing, together with the response patterns symmetrically disposed about the same, is highly exaggerated insofar as the angle formed by each of the shifted directions of maximum response with respect to the normal axis of the antenna is concerned. Actually, the direction of maximum response is shifted only a few degrees from the normal, approximately 5°.

In order to obtain the necessary shifts of the direction of maximum response, the phasing units are so related to each other that, for the shift to the left, the units 65 and 66 present similar delays to the groups of signals collected by the antenna bays 56 and 57, and the units 68 and 67 present the same delays to the groups of signals collected by the antenna bays 59 and 58, but, the first pair of units is out of phase with the second pair of units. When the direction of maximum response is to be shifted below the reference axis of the antenna, the units 66 and 67 are paired and the units 65 and 68 are paired, but the delays introduced by the first-named pair are different from the delays introduced by the second-named pair. The shift to the right is obtained by pairing the units 68 and 67 and the units 65 and 66, again, with the delays introduced by the first pair different from the delays introduced by the second pair and opposite to the delays introduced for the shift to the left. Finally, the direction of maximum response is shifted upwardly by pairing the units 65 and 68 and the units 66 and 67, again, with the phase shifts introduced by the first pair being different from the phase shifts introduced by the second pair and opposite to the delays introduced for the shift downwardly.

In order to coordinate the oscilloscope display with the shifting of direction of maximum response of the antenna, the sweep generator 79 is mechanically coupled to the motor 84 as indicated by the broken line between these two components.

Figure 5A:
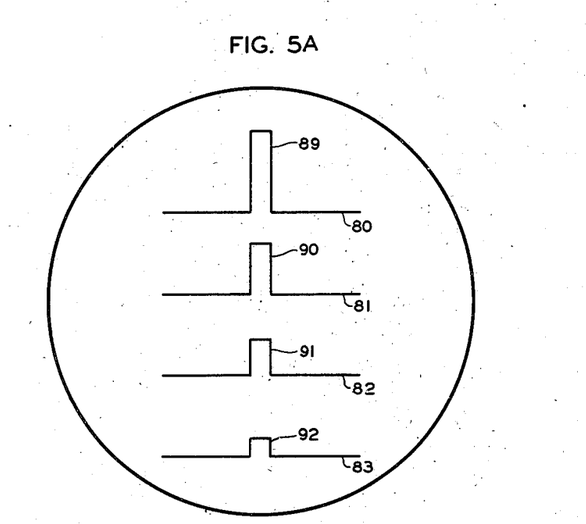
Figures 5A and 5B show one type of oscilloscope display which may be utilized in connection with the system of Figure 4.
Figure 5B:
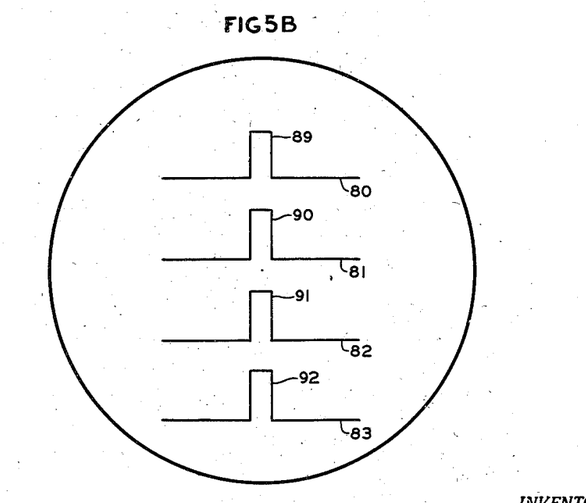

Reference is made to Figure 5 (A and B). In these views the reference characters 80 to 83 inclusive, designate the periodically-displaced base lines with which the oscilloscope is provided by the sweep generator 79 under the control of the motor 84. From top to bottom these lines are respectively receptive of the received signals when the direction of maximum response is in each of the successive positions to the left, below, to the right, and above the reference axis of the antenna.

Referring now more particularly to Figure 5 (A), it will be noted that the base lines are deflected as at 89, 90, 91, and 92, the uppermost deflection being of the greatest amplitude and the remaining deflections becoming progressively smaller. Such a display indicates an "off-target" condition, and advises the observer that the source of the wave energy being received is located to the left and below the reference axis of the antenna. It further advises the observer that said source is farther to the left of said axis than it is below the same. Orientation of the antenna is therefore necessary in two directions, in a counter-clockwise direction on the vertical axis thereof until the deflections 89 and 90 become of equal amplitude, and, on the horizontal axis thereof, with the upper edge tilted forwardly until the deflections 91 and 92 become of equal amplitude. Figure 5 (B), wherein all the deflections are of equal amplitude, represents the "on-target" condition.

This completes the description of our present invention. It will be noted from all of the foregoing that the disadvantages inherent in the previous method of determining the direction of arrival of wave energy, as set forth in the earlier portions of this specification, are eliminated by the system of the present invention. The prior system required the operator to determine when the amplitude of the received signals reached a maximum or minimum value and, inasmuch as the amplitude of the received signals depends upon two variables, namely, the plane of the antenna with respect to the plane of the wave front of said signals, and the instantaneous location of the source of said signals with respect to the detecting station, it was almost impossible to judge accurately when the antenna was properly oriented to result in said maximum or minimum amplitude. However, our present invention depends upon a comparison, by the operator, of at least two groups of signals which are visually before him at all times, and inasmuch as it is much easier to judge when two comparative groups of signals are of equal amplitude than it is to judge when a single group of signals is of maximum or minimum amplitude, our present invention effectively avoids the difficulties of the prior system.

In addition, our present invention merely requires orienting the antenna until equal amplitude signals are observed, whereas the prior system required laborious rocking of the antenna until maximum or minimum amplitude was obtained. Obviously the present procedure is much less tedious and requires much less skill on the part of the operator.

Other advantages of our present invention will readily occur to those skilled in the art to which the same relates.

We claim:

1. Means for determining the direction of arrival of wave energy comprising: a collector having at least two coplanar directional elements coupled to a common receiver, said elements being so phasally related that the direction of maximum response of said collector is normally perpendicular to the plane thereof; means for so dephasing said elements, relative to each other, as to cyclically wobble said direction of maximum response symmetrically about said perpendicular, whereby a plurality of groups of signals is obtained each of whose amplitude is a function of the instantaneous direction of said direction of maximum response; means for simultaneously indicating the relative amplitudes of said groups of signals; and means for so orienting said collector that the groups of signals received, when said direction of maximum response differs from said perpendicular by equal and opposite angles, are of equal amplitudes.

2. Means for determining the direction of arrival of wave enrgy comprising: a collector having at least two coplanar directional elements coupled to a common receiver, said elements being connected to said receiver by transmission lines of normally equal electrical lengths whereby said elements are so phasally related that the direction of maximum response of said collector is perpendicular to the plane thereof; means for altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; means for simultaneously indicating the relative amplitudes of said groups of signals; and means for so orienting said collector that the groups of signals received, when said direction of maximum response differs from said perpendicular by equal and opposite angles, are of equal amplitudes.

3. Means for determining the direction of arrival of wave energy comprising: a collector having at least two coplanar directional elements coupled to a common receiver, said elements being so phasally related that the direction of maximum response of said collector is normally perpendicular to the plane thereof; means for so dephasing said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope, having a rapidly-recurring trace adapted to be deflected by said groups of signals, for simultaneously indicating the relative amplitudes thereof; and means for so orienting said collector that the groups of signals received, when said direction of maximum response differs from said perpendicular by equal and opposite angles, are of equal amplitudes.

4. Means for determining the direction of arrival of wave energy comprising: a collector having at least two coplanar directional elements coupled to a common receiver, said elements being connected to said receiver by transmission lines of normally equal electrical lengths whereby said elements are so phasally related that the direction of maximum response of said collector is normally perpendicular to the plane thereof; means for altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope, having a rapidly-recurring trace adapted to be deflected by said groups of signals, for simultaneously indicating the relative amplitudes thereof; and means for so orienting said collector that the groups of signals received, when said direction of maximum response differs from said perpendicular by equal and opposite angles, are of equal amplitudes.

5. Means for determining the direction of arrival of wave energy comprising: a collector having at least two coplanar directional elements coupled to a common receiver, said elements being so phasally related that the direction of maximum response of said collector is normally perpendicular to the plane thereof; means for so dephasing said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope for comparing the relative amplitudes of said groups of signals, said oscilloscope having a rapidly-recurring trace adapted to be periodically displaced, in synchronism with the cyclic wobbling of said direction of maximum response, to obtain a base line corresponding to each of the altered directions of said direction of maximum response, each such base line being deflected by the group of signals received when said direction of maximum response is in the direction corresponding thereto; and means for so orienting said collector that the groups of signals received, when said direction of maximum response differs from said perpendicular by equal and opposite angles, are of equal amplitudes.

6. Means for determining the direction of arrival of wave energy comprising: a collector having at least two coplanar directional elements coupled to a common receiver, said elements being connected to said receiver by transmission lines of normally equal electrical lengths whereby said elements are so phasally related that the direction of maximum response of said collector is perpendicular to the plane thereof; means for altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope for comparing the relative amplitudes of said groups of signals, said oscilloscope having a rapidly-recurring trace adapted to be periodically displaced, in synchronism with the cyclic wobbling of said direction of maximum response, to obtain a base line corresponding to each of the altered directions of said direction of maximum response, each such base line being deflected by the group of signals received when said direction of maximum response is in the direction corresponding thereto; and means for so orienting said collector that the groups of signals received, when said direction of maximum response differs from said perpendicular by equal and opposite angles, are of equal amplitudes.

7. Means for determining the direction of arrival of wave energy comprising: a collector having at least two coplanar directional elements coupled to a common receiver, said elements being so phasally related that the direction of maximum response of said collector is normally perpendicular to the plane thereof; means for equally and oppositely dephasing said elements to cyclically wobble said direction of maximum response symmetrically about said perpendicular, whereby a plurality of groups of signals is obtained each of whose amplitude is a function of the instantaneous direction of said direction of maximum response; means for comparing the relative amplitudes of said groups of signals; and means for so orienting said collector that the groups of signals received, when said direction of maximum response differs from said perpendicular by equal and opposite angles, are of equal amplitudes.

8. Means for determining the direction of arrival of wave energy comprising: a collector having at least two coplanar directional elements coupled to a common receiver, said elements being connected to said receiver by transmission lines of normally equal electrical lengths whereby said elements are so phasally related that the direction of maximum response of said collector is normally perpendicular to the plane thereof; means for equally and oppositely altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; means for comparing the relative amplitudes of said groups of signals; and means for so orienting said collector that the groups of signals received, when said direction of maximum response differs from said perpendicular by equal and opposite angles, are of equal amplitudes.

9. Means for determining the direction of arrival of wave energy comprising: a collector having at least two coplanar directional elements coupled to a common receiver, said elements being connected to said receiver by transmission lines of normally equal electrical lengths whereby said elements are so phasally related that the direction of maximum response of said collector is normally perpendicular to the plane thereof; means for equally and oppositely altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope, having a rapidly-recurring trace adapted to be deflected by said groups of signals, for comparing the relative amplitudes thereof; and means for so orienting said collector that the groups of signals, received when said directions of maximum response differs from said perpendicular by equal and opposite angles, are of equal amplitudes.

10. Means for determining the direction of arrival of wave energy comprising: a collector having at least two coplanar directional elements coupled to a common receiver, said elements being connected to said receiver by transmission lines of normally equal electrical lengths whereby said elements are so phasally related that the direction of maximum response of said collector is normally perpendicular to the plane thereof; means for equally and oppositely altering the electrical lengths of said transmission lines to so dephase said elements, relative to each other, as to cyclically wobble said direction of maximum response symmetrically about said perpendicular, whereby a plurality of groups of signals is obtained each of whose amplitude is a function of the instantaneous direction of said direction of maximum response; an oscilloscope for comparing the relative amplitudes of said groups of signals, said oscilloscope having a rapidly-recurring trace adapted to be periodically displaced, in synchronism with the cyclic wobbling of said direction of maximum response, to obtain a base line corresponding to each of the altered directions of said direction of maximum response, each such base line being deflected by the group of signals received when said direction of maximum response is in the direction corresponding thereto; and means for so orienting said collector that the groups of signals received, when said direction of maximum response differs from said perpendicular by equal and opposite angles, are of equal amplitudes.

11. Means for determining the direction of arrival of wave energy comprising: a collector having a plurality of coplanar directional elements arranged in a square and coupled to a common receiver, said elements being so phasally related that the direction of maximum response of said collector is normally perpendicular to the plane thereof; means for so dephasing said elements, in pairs, as to cyclically wobble said direction of maximum response symmetrically about said perpendicular through 360°, whereby a plurality of groups of signals is obtained each of whose amplitude is a function of the instantaneous direction of said direction of maximum response; means for simultaneously indicating the relative amplitudes of said groups of signals; and means for so orienting said collector in azimuth and in elevation that the groups of signals received, when said direction of maximum response differs from said perpendicular by equal and opposite azimuthal and elevational angles, are of equal amplitudes.

12. Means for determining the direction of arrival of wave energy comprising: a collector having a plurality of coplanar directional elements arranged in a square and coupled to a common receiver, said elements being connected to said receiver by transmission lines of normally equal electrical lengths whereby said elements are so phasally related that the direction of maximum response of said collector is perpendicular to the plane thereof; means for altering the electrical lengths of said transmission lines to so dephase said elements, in pairs, as to cyclically wobble said direction of maximum response symmetrically about said perpendicular through 360°, whereby a plurality of groups of signals is obtained each of whose amplitude is a function of the instantaneous direction of said direction of maximum response; means for simultaneously indicating the relative amplitudes of said groups of signals; and means for so orienting said collector in azimuth and in elevation that the groups of signals received, when said direction of maximum response differs from said perpendicular by equal and opposite azimuthal and elevational angles, are of equal amplitudes.

13. Means for determining the direction of arrival of wave energy comprising: a collector having a plurality of coplanar directional elements arranged in a square and coupled to a common receiver, said elements being so phasally related that the direction of maximum response of said collector is normally perpendicular to the plane thereof; means for so dephasing said elements, in pairs, as to cyclically wobble said direction of maximum response symmetrically about said perpendicular through 360°, whereby a plurality of groups of signals is obtained each of whose amplitude is a function of the instantaneous direction of said direction of maximum response; an oscilloscope for comparing the relative amplitudes of said groups of signals, said oscilloscope having a rapidly-recurring trace adapted to be periodically displaced, in synchronism with the cyclic wobbling of said direction of response, to obtain a base line corresponding to each of the altered directions of said direction of maximum response, each such base line being deflected by the group of signals received when said direction of maximum response is in the direction corresponding thereto; and means for so orienting said collector in azimuth and in elevation that the groups of signals received, when said direction of maximum response differs from said perpendicular by equal and opposite azimuthal and elevational angles, are of equal amplitudes.

14. Means for determining the direction of arrival of wave energy comprising: a collector having a plurality of coplanar directional elements arranged in a square and coupled to a common receiver, said elements being connected to said receiver by transmission lines of normally equal electrical lengths whereby said elements are so phasally related that the direction of maximum response of said collector is perpendicular to the plane thereof; means for altering the electrical lengths of said transmission lines to so dephase said elements, in pairs, as to cyclically wobble said direction of maximum response symmetrically about said perpendicular through 360°, whereby a plurality of groups of signals is obtained each of whose amplitude is a function of the instantaneous direction of said direction of maximum response; an oscilloscope for comparing the relative amplitudes of said groups of signals, said oscilloscope having a rapidly-recurring trace adapted to be periodically displaced, in synchronism with the cycle wobbling of said direction of maximum response, to obtain a base line corresponding to each of the altered directions of said direction of maximum response, each such base line being deflected by the group of signals received when said direction of maximum response is in the direction corresponding thereto; and means for so orienting said collector in azimuth and in elevation that the groups of signals received, when said direction of maximum response differs from said perpendicular by equal and opposite azimuthal and elevational angles, are of equal amplitudes.

ROGER B. COLTON.
REX V. D. CORPUT.
ELEANOR T. WATSON,
Administratrix of the Estate of Paul E. Watson, Deceased.

REFERENCES CITED

The following references are of record in the file of this patent:

UNITED STATES PATENTS

| Number | Name | Date |
|---|---|---|
| 2,178,074 | Jakel et al. | Oct. 31, 1939 |
| 2,275,460 | Page | Mar. 10, 1942 |
| 2,083,242 | Runge | June 8, 1937 |
| 2,279,246 | Podliasky et al. | Apr. 7, 1942 |
| 2,176,469 | Moueix | Oct. 17, 1939 |
| 2,189,549 | Hershberger | Feb. 6, 1940 |

FOREIGN PATENTS

| Number | Country | Date |
|---|---|---|
| 546,488 | Great Britain | July 16, 1942 |